UNITED STATES PATENT OFFICE.

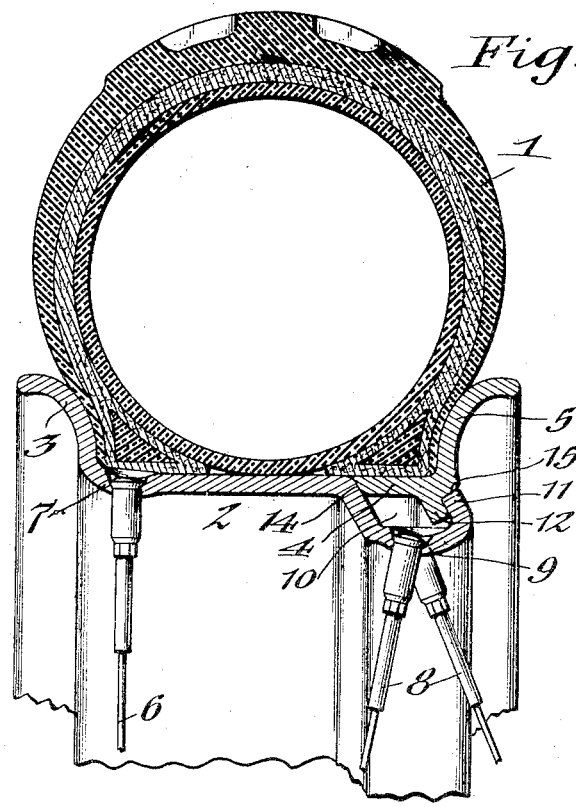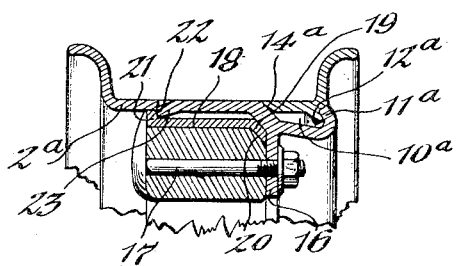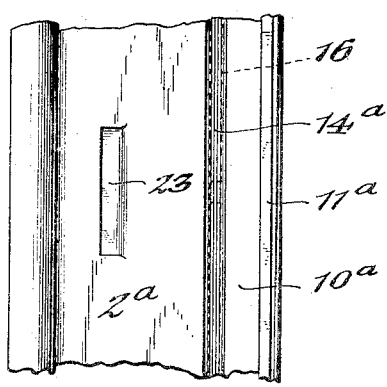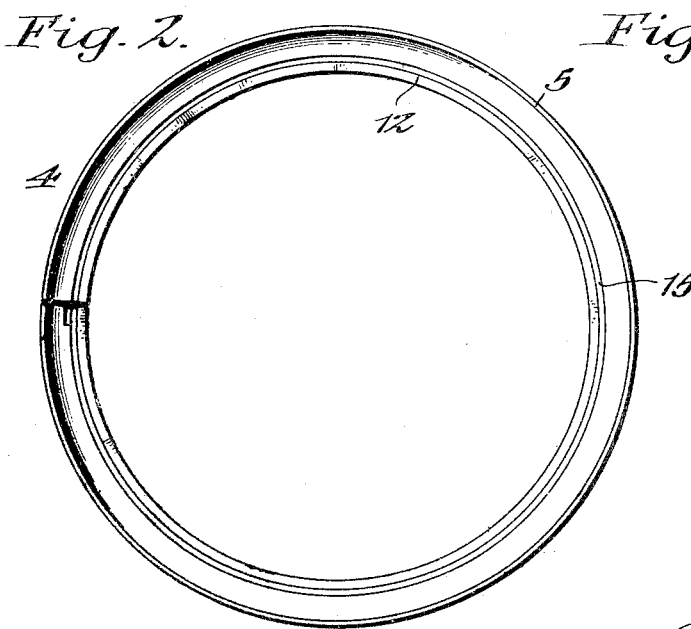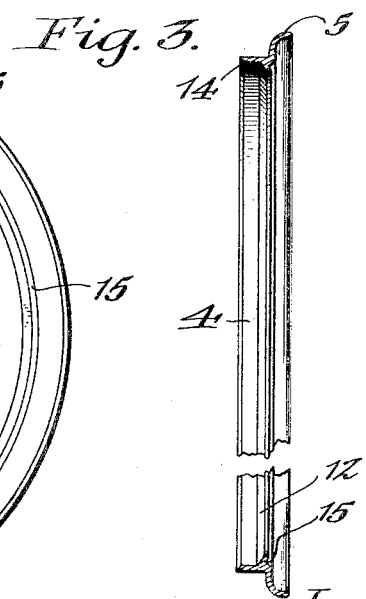

CHARLES JOHNSON, OF BUFFALO, NEW YORK, ASSIGNOR TO JOHNSON RIM AND PARTS COMPANY, INC., OF BUFFALO, NEW YORK.

WHEEL-RIM.

1,363,182.   Specification of Letters Patent.   Patented Dec. 21, 1920.

Application filed August 16, 1919. Serial No. 317,869.

*To all whom it may concern:*

Be it known that I, CHARLES JOHNSON, a citizen of the United States, residing at Buffalo, in the county of Erie and State of New York, have invented new and useful Improvements in Wheel-Rims, of which the following is a specification.

This invention relates to wheel rims, and more particularly the rims of automobile wheels having pneumatic tires and including a detachable flanged member for removably retaining the tire on the rim.

One of its objects is the provision of an inexpensive rim of this character in which the detachable flanged member is retained in engagement with the rim-base by the tire, thus dispensing with separate fastening or locking devices for this purpose and materially reducing the cost of the rim.

Additional objects of the invention are to improve the construction of the parts with a view of rendering the removable rim-member securely self-locking; and to so construct the rim-base as to facilitate the application and removal of the tire, and so that when the rim is used on a wire wheel, the heads of the spokes will fully clear the removable rim-member as well as the tire, to permit easy application and removal of these parts and prevent wear of the tire-base; also to produce a rim which by its structure makes it possible to produce a stronger wheel; also to improve the construction of rims of this kind in other respects hereinafter specified.

In the accompanying drawings:

Figure 1 is a fragmentary transverse section of a wire wheel embodying the invention. Fig. 2 is a side elevation of the detachable locking ring. Fig. 3 is a transverse section thereof. Fig. 4 is a fragmentary transverse section of a vehicle wheel with a felly, showing the use of the improvement in connection with a wooden wheel. Fig. 5 is a fragmentary face view of the rim shown in Fig. 4.

Similar characters of reference indicate corresponding parts throughout the several views.

Referring to Figs. 1-3, 1 indicates a pneumatic tire of any ordinary construction, that shown in the drawings comprising the customary inner tube inclosed by a shoe. The tire is removably seated in the annular channel of the rim, which latter comprises a base or main portion 2 provided at one edge with a tire-retaining flange 3, and a removable split ring 4 forming a lateral continuation of the rim-base and provided at its outer edge with a similar flange 5, between which flanges the tire is confined.

In the construction shown, the wheel is provided at its inner side with the usual single row of wire-spokes 6, passing through openings which are preferably formed in cups or indentations 7 stamped in the base of the rim, and in which the heads of the spokes are countersunk to clear the adjacent portion of the tire shoe. At its outer side the wheel may be provided with the usual double row of outwardly-converging spokes 8, the heads of which are seated in similar perforated cups 9, preferably stamped in the bottom of a comparatively wide groove 10 formed by depressing the adjacent marginal portion of the rim-base below the level of its main portion. The groove 10 is closed at its outer side by the encircling ring 4 which is removably seated upon the inner and outer walls of said groove. The outer wall of the groove preferably is undercut or bent toward its opposite wall to form an annular locking flange 11 which inclines outwardly, as shown in Fig. 1. The ring 5 is provided on its underside near its outer edge, with an outwardly-inclined flange or lip 12 which extends into the groove 10 and bears against the inner side of the flange 11, thus interlocking therewith and preventing outward displacement of the ring both radially and laterally of the wheel, when the tire is in place on the rim, the inward pressure of the tire locking the ring in engagement with the base-flange 11. To increase this locking effect, the inner wall of the groove 10 is inclined outwardly substantially parallel with its outer wall and the ring-flange 12, and the contiguous inner edge of the ring-base is correspondingly beveled or inclined, as shown at 14, so that under the pressure exerted against the face of the ring by the tire, the incline of the ring rides inwardly on the incline of the rim-base, thereby constantly wedging the ring-flange 12 against the corresponding flange 11 of the ring-base and rendering the ring practically self-locking. By this means, the ring is reliably locked on the rim-base without the use of bolts or other extraneous fastenings, thus not only saving time in applying and removing the tire, but also materially simplifying its construction and lessening its cost.

As shown in Fig. 1, the locking-flange 11 of the rim-base is preferably depressed below the level of the face or tire-seat of the base. This construction permits the tire to be easily slipped onto the rim-base without restraint by the flange 11 and likewise facilitates the removal of the tire. In their preferred form, the depressed upper edge of the flange 11 and the contiguous bottom-portion of the ring 4 are beveled or inclined inwardly, as shown at 15.

The peripheral face 15 of the locking flange 11 is arranged outwardly beyond the plane of the outer edge of the tire base, and by means of this arrangement, the locking ring offers a greatly increased resistance to the lateral forces acting thereon. The pressure of the tire acting laterally on the tire-retaining flange 5 is counteracted by the pressure of the base of the tire on the flange 4, and by placing the face 15, which acts as a fulcrum, outwardly beyond the plane of the outer portions of the tire base, as shown, this fulcrum is so positioned that the pressure of the tire base on the flange 4 can readily overcome the pressure acting on the tire-retaining flange 5. By inclining the face 15 as shown, this face practically receives the pressure on the locking ring at right angles and this inclination also insures a good interlocking fit between the locking lip 12 and the locking flange 11. By means of the construction described the deflection of movement of the flange 5 with reference to the flange 3 is practically negligible even when the tire is subjected to extreme pressures, thus insuring a proper supporting of the tire at all times.

The ring-flange 12 is of such width or depth as to clear the bottom of the groove 10 under all conditions and permit the ring to seat upon the inclined walls of the groove 10 in order to secure the self-locking action above described. This construction also causes the locking-ring to bear against the rim-base at two points or edges only, enabling the ring to better adjust itself to its seat and bear firmly thereon.

The construction shown has the further advantage of affording a comparatively wide lacing-range or field for the spokes, producing a stronger and more stable wheel. This field is increased about three eighths of an inch over that of the wire-wheels now on the market, making the gage or distance between wheels transversely of a motor car equal to the gage of cars having wooden wheels, whereas cars equipped with wire wheels, as now made, have the gage somewhat greater than that of wooden wheels.

This improved rim also makes it possible to arrange the inner set of spokes in a plane perpendicular to the axle or axis of the hub. This produces a stronger construction and makes it possible to have the spokes of greater tension than in other wire wheels, and also greatly facilitates the truing of the wheels. The construction of the removable tire-retaining ring of the same outside diameter as the integral retaining flange 5 of the rim also produces a stronger rim than one in which said removable ring is of smaller diameter than the integral flange and holds the tire on the wheel more securely.

The depressed marginal portion of the rim-base, moreover, prevents undue springing of the rim when the spokes are laced or tightened, the smaller diameter of that grooved-portion rendering the rim stronger and stiffer than if it were of uniform diameter across its width.

By depressing the heads or lacings of the spokes at the outer portion of the rim-seat, the application of the tire is not only facilitated, but wear of its base by the spoke-heads is obviated. So also the application of the split ring is facilitated by the inclination of its lip which slips over or coöperates with the inclined outer face of the locking flange 11 of the wheel rim.

By extending the base of the locking ring inwardly and laterally some distance beyond its locking lip 12, as shown, the ring-base presents a bearing surface of considerable area to the base-portion of the tire and practically acts as the lower arm of a bell-crank lever which is fulcrumed at 15 and whose upper arm is formed by the tire-retaining flange 5 of the ring. The ring-base, under the pressure of the inflated tire, thus offers a powerful resistance to a force tending to tilt or displace the said tire-retaining flange 5 outwardly and laterally.

It will be noted that only the outer face of the ring-lip 12 interlocks with the locking flange of the wheel-rim and that the inner face of the lip is spaced at a distance from the opposing inner wall of the groove 10, leaving a clearance space on the inner side of the lip. This provision prevents the lip from becoming bound or wedged between the walls of the groove and facilitates the loosening and detachment of the ring, particularly in case the parts should become rusted.

The improvement is also applicable to wooden wheels having demountable rims, a modification of the invention suitable for such wheels being illustrated in Figs. 4 and 5. In this case, the rim-base 2ª is provided with an inwardly-extending annular flange 16, preferably integral therewith, which bears against one side of the felly and is secured thereto by a series of transverse bolts one of which is shown at 17 in Fig. 4, or by other appropriate fastenings. The metallic band or rim 18 of the felly is provided at one side with a beveled face 19 which bears against a correspondingly-beveled face 20 on the rim-base. At its opposite edge, the band is provided with an outwardly-extending flange 21 against which abut stops 22 arranged at intervals on the underside of the rim-base and preferably formed by tongues or lips 23 stamped out of the base and projecting beyond the inner side thereof, as shown in Fig. 4. As in the first-described construction, the outer portion 10ª of the rim-base is grooved or depressed below the level of its main portion to permit the face of the locking-ring to come substantially flush with the face of the rim-base. The ring is provided with an inclined or wedging edge 14ª which bears against the inclined inner wall of the groove 10ª, while near its outer edge the ring is provided with an inclined flange 12ª which interlocks with the correspondingly-inclined outer wall 11ª of said groove, as in the first-described construction. In this modification, the groove of the rim-base need not be so deep as that of the construction shown in Figs. 1-3, inasmuch as the spokes do not pass through the rim-base.

As the rim comprises in its simplest form but two members, viz: the flanged rim-base and the flanged locking-ring, the rim can be produced at a cost but litttle if any greater than that of an ordinary metallic wheel-rim, enabling manufacturers to substitute such rims for ordinary ones without materially increasing the cost of the wheels.

I claim as my invention:

1. A wheel rim comprising a rim base having a relatively wide annular groove formed in one of its marginal portions, said groove having inner and outer walls, said outer wall being undercut to form a locking flange, and a removable ring having a tire-retaining flange at its outer edge and a locking lip on its under side arranged in said groove and being adapted to engage with said undercut part of said locking flange, said ring having a base portion extending across said groove and forming substantially a continuation of said rim base and engaging said inner wall of said groove, said inner wall having a portion coöperating with said base portion to force said locking ring outwardly for pressing said locking lip into locking engagement with said locking flange.

2. A wheel rim comprising a rim base having a relatively wide annular groove formed in one of its marginal portions, said groove having inner and outer walls, the inner faces of said walls having parts which extend laterally outward, and a removable ring which covers said groove and which has a tire-retaining flange at its outer edge and a locking lip having an outer face inclined to correspond substantially with the inclination of said outer wall, said ring having a portion extending laterally across said groove and engaging the inclined portion of said inner wall, and held in engagement therewith by the base of a tire.

3. A wheel rim comprising a rim base having a relatively wide annular groove formed in one of its marginal portions, the outer edge of said groove being provided with a locking flange having a smaller outer diameter than the outer diameter of said base and having an undercut inner face, and a removable ring surrounding said groove and having a shoulder engaging the outer edge of said locking flange and a locking lip engaging the undercut face of said locking flange, said ring having a part upon which the base of a tire bears and which bears on the opposite wall of said groove, whereby said locking ring is held out of contact with the base of said groove.

4. A wheel rim comprising a rim base provided at one edge with a tire-retaining flange and in its opposite marginal portion with a relatively wide, flat-bottomed annular groove adapted to receive the heads of a series of spokes, the outer wall of said groove being undercut, and a ring covering said groove and having a tire-retaining flange and provided on its underside with a locking lip extending into said groove and interlocking with said undercut wall, said ring engaging the upper portions of said inner and outer walls and being held thereby at a distance from the bottom of said groove.

5. A wheel rim comprising a rim base provided at one edge with a tire-retaining flange and in its opposite marginal portion with an annular groove adapted to receive the heads of a series of spokes, the outer wall of said groove being undercut, and a ring encircling the grooved portion of the rim base and having a body portion extending inwardly and laterally beyond said locking lip and across said groove, and substantially flush with the face of the rim base, said ring having a tire-retaining flange and a locking lip arranged on its underside and interlocking with said undercut wall, the inner wall of said groove being separated from said locking lip by an intervening space, the portion of the groove-bottom opposite said space having openings for receiving the spokes.

6. A wheel rim for use in connection with a resilient tire, comprising a rim base having a relatively wide annular groove formed in one of its marginal portions, said groove having an outer wall extending laterally beyond the base of the tire, and a removable ring having a tire-retaining flange, a part resting on the peripheral face of said outer wall beyond the plane of the outer edge of the base of the tire, a lip adapted to engage the inner face of said outer wall, and a base flange bridging said groove and engaging the base of said tire, whereby the pressure of the base of the tire against said base flange acts with greater leverage on said ring than the pressure acting against said tire retaining flange thereof.

CHARLES JOHNSON.